United States Patent [19]
Zens

[11] Patent Number: 5,372,094
[45] Date of Patent: Dec. 13, 1994

[54] BIRD FEEDER

[76] Inventor: Roger A. Zens, Rural Rte. 3, Box 34, Zell, S. Dak. 57469

[21] Appl. No.: 149,731

[22] Filed: Nov. 10, 1993

[51] Int. Cl.$^5$ .................................. A01K 39/00
[52] U.S. Cl. ................................ 119/522; 119/23; 229/103
[58] Field of Search ............... 119/52.2, 52.3, 57.8, 119/57.9, 23; 229/103, 213, 215, 122.1

[56] References Cited

U.S. PATENT DOCUMENTS

| | | | |
|---|---|---|---|
| 2,775,226 | 12/1956 | Early . | |
| 2,891,711 | 6/1959 | Early | 229/122.1 |
| 2,943,600 | 7/1960 | Rosoff . | |
| 3,089,462 | 5/1963 | Brockman . | |
| 3,179,244 | 4/1965 | Kuhn | 119/52.2 |
| 3,354,868 | 11/1967 | Woodling | 119/52.2 |
| 3,418,974 | 12/1968 | Reeves . | |
| 3,441,002 | 4/1969 | Lawalin et al. . | |
| 3,777,711 | 12/1973 | Gampp | 119/52.2 |
| 3,945,348 | 3/1976 | Melrath | 119/57.8 |
| 4,026,244 | 5/1977 | Salick | 119/57.8 |
| 4,233,941 | 11/1980 | Webster . | |
| 4,242,984 | 1/1981 | Smith | 119/52.2 |
| 4,947,797 | 8/1990 | Lawrence, Jr. | 119/52.2 |
| 4,955,319 | 9/1990 | Brucker | 119/52.2 |
| 5,025,753 | 6/1991 | Schneider | 119/57.8 |

FOREIGN PATENT DOCUMENTS 948716 2/1964 United Kingdom .
8402056 6/1984 WIPO .

Primary Examiner—Gene Mancene
Assistant Examiner—Todd E. Manahan
Attorney, Agent, or Firm—Richard C. Litman

[57] ABSTRACT

A bird feeder is made from a paperboard container, such as those commonly employed to contain milk. In a first embodiment, two slots are cut in the container above the floor in opposing vertical walls, and two holes are formed near the floor, one hole located below each slot. Feed troughs are attached to the container by tabs which expand inside the container after being passed through a slot, each slot serving one trough. In this embodiment, a separate perch is provided by a rod or stick projecting from the container. The perch is supported by the container floor, and held in place by frictional fit as it penetrates the two opposing holes below the slots. In a second embodiment, there is only one hole and one slot, the slot being located at the level of the hole. The perch and trough are provided as a unitary structural element, the trough having a peg projecting outwardly, so as to provide a foothold for a bird. The trough penetrates the slot, and an attached rod portion extends from the trough to the opposing wall, passing through the hole. A groove formed in the rod assures securement of the perch and trough component with the container by engaging the wall of the container.

3 Claims, 2 Drawing Sheets

BIRD FEEDER

BACKGROUND OF THE INVENTION

1. Field of the Invention

The present invention relates to a bird feeder, and more particularly, to a construction employing a paperboard container therefor, e.g., a common milk container.

2. Description of the Prior Art

Bird feeders have been the subject of prior art patents. The prior art has also employed paperboard containers as base structures for subsequent modification to provide bird feeders. A primary example is U.S. Pat. No. 2,775,226, issued on Dec. 25, 1956 to Robert L. Early. A metal or plastic trough is combined with a paperboard container, the latter being scored, cut, and folded as appropriate to form a suitable, cooperating base for receiving the trough. The trough remains external to the container, and provides a suitable perch enabling a bird partial entry to the interior of the container. The bird has access to feed available within the container from this position.

Further examples of bird feeders based on paperboard containers are seen in U.S. Pat. Nos. 3,441,002, issued to Harold L. Lawalin et al. on Apr. 29, 2969, and 4,233,941, issued to Ralph K. Webster on Nov. 18, 1980. Lawalin et al. '002 provides a flap or opening projecting inwardly into the container, thus providing access to food. '002 also includes a wire or rod perch which engages this opening. A bird sits on the perch, and avails itself to seed or other food matter within the container by inserting its head into the container.

Webster '941 modifies the container such that a tab formed therein, and formerly providing a member reinforcing the floor of the container, now projects outwardly, in the manner of a ledge, to provide a perch. The perch is secured against leaning downwardly in response to the weight of a bird by two triangular buttressing members attached to the body of the container. A small opening discharges seed or other food matter onto the perch. This food supply is replenished by gravitational migration of the food supply stored within the container.

U.S. Pat. No. 3,089,462, issued to Virgil C. Brockman on May 14, 1963, discloses a paperboard container preconfigured to fold into a configuration essentially similar to Webster '941 and to Early '226.

Another combination container and feeder is seen in U.S. Pat. No. 2,943,600, issued to Arthur M. Rosoff on Jul. 5, 1960. A feed dispensing tray or drawer pulls out from the container.

None of the above inventions and patents, taken either singly or in combination, is seen to describe the instant invention as claimed.

SUMMARY OF THE INVENTION

It is desirable to construct a bird feeder from a paperboard container. This construction enables reuse of an object that would otherwise likely be discarded as refuse. It also provides highly suitable building materials which are already substantially configured as desired to provide the final structure. It also is highly economical to reuse a paperboard container.

Furthermore, an assembly project of this type and magnitude offers an enjoyable exercise in small scale building and assembling to a young hobbyist, and may stimulate interest in birds.

The paperboard container is easily cut to provide the necessary apertures cooperating with the remaining component or components. In one embodiment, remaining components are provided by an uncomplicated, inexpensive, readily available object and a material having similar characteristics.

In the first embodiment, a bird perch and troughs or chutes are attached to a paperboard container. A type of waxed paperboard container typically employed in retailing milk and other fluent materials is preferred, since waxed paperboard will resist rain.

The bird perch is provided by a pointed peg forced through the container just above the floor thereof. The troughs are formed from folded paperboard or similar material.

In a second embodiment, there is a prefabricated component enabling very speedy completion of the construction procedure. This component resembles a miniature shovel comprising handle and scoop. In this embodiment, perch and trough functions are both provided by the scoop. The elongated handle portion extends along the floor of the container, penetrating a hole on the wall opposite the slotted wall. The handle retains the shovel component within the container.

In both embodiments, a tether is passed through the peaked roof of the container, to enable the bird feeder to be suspended, as from a tree limb.

Accordingly, it is a principal object of the invention to provide a bird feeder wherein a majority of the structure is provided by a paperboard container.

It is another object of the invention to provide a bird feeder construction wherein the only modifications to the paperboard container comprise cutting out or punching openings thereinto, and components added to the container are retained thereto by interengagement of these components with these openings.

It is a further object of the invention to provide a bird feeder which is suspended from above.

Still another object of the invention is to provide a bird feeder having an external feeding trough constructed to support the weight of a bird and to be readily attached to a paperboard container.

An additional object of the invention is to provide a bird feeder construction employing tab and hole attachment of constituent components.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention provides a bird feeder 10 which is relies for its principal structure on a paperboard container 12. Paperboard container 12 has a peaked top capable of being opened, then refolded to seal the interior. Due to this characteristic and due to the customary use of waxed paperboard in manufacturing this type of receptacle, paperboard container 12 provides a highly suitable principal structure for modification to become the novel bird feeder 10.

Figure 1:
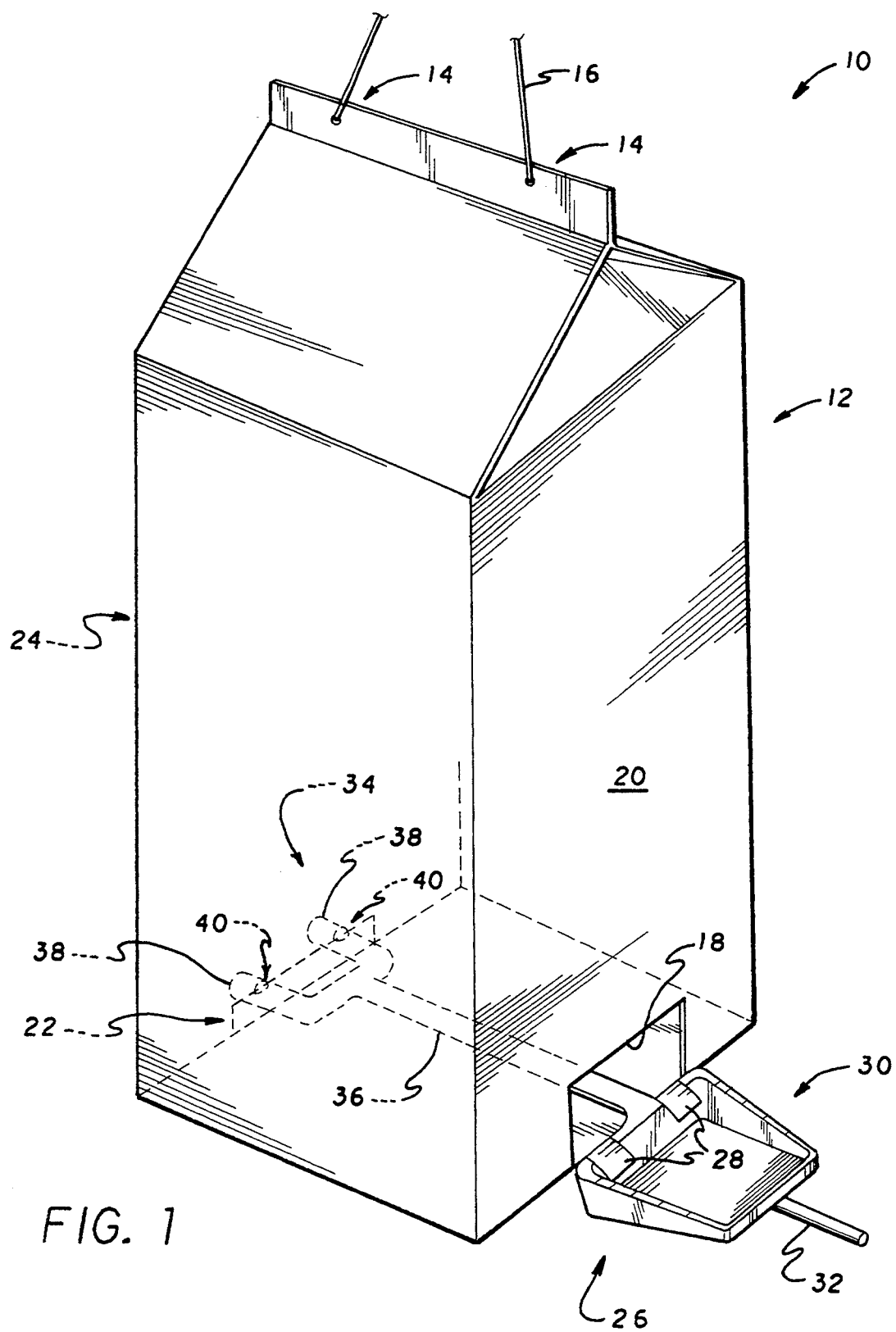
FIG. 1 is a perspective view of a preferred embodiment of the invention.

In a first embodiment, shown in FIG. 1, paperboard container is cut or punched to include two holes 14 for attaching a suspension string 16, and two slots. A front slot 18 is formed in front wall 20, and rear slot 22 is formed in rear wall 24. Rear wall 24 is, preferably, that wall opposite front wall 20. A prefabricated perch and feed trough assembly 26 is inserted into slots 18 and 22, and two tabs 28 remaining from the cutting operation which produced slot 18 are folded over a scoop portion 30 of assembly 26.

Scoop portion 30 includes an integral projecting peg 32 providing a perch for a bird.

Figure 2:
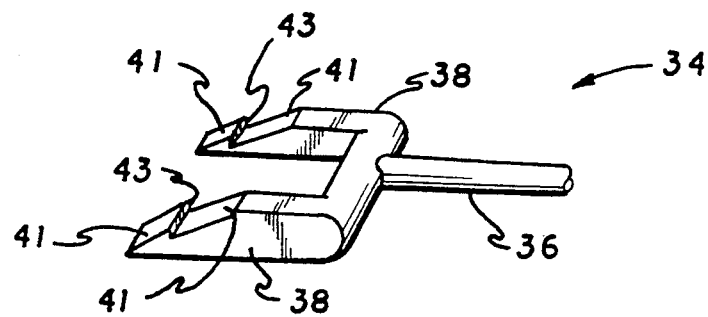
FIG. 2 is a perspective detail view of a component found at the lower left portion of FIG. 1, showing a preferred form of this component which could not be clearly illustrated in the depiction of FIG. 1.

Assembly 26 is also anchored to paperboard container 12 at rear wall 24 by interengagement of a securement portion 34 of assembly 26. This is better seen in FIG. 2. Scoop portion 30 is attached to securement portion 34 of assembly 26 by a stem 36. Securement portion 34 has two notched prongs 38 horizontally spaced apart and engaging rear slot 22. This arrangement opposes a moment which could otherwise rotate assembly 26 about the axis of stem 36, as in response to a bird shifting position while being supported on scoop portion 30. Notches 40 engage rear wall 24 just above rear slot 22, this engagement being clearly illustrated in FIG. 1. Ramps 41 guide prongs 38 past rear wall 24, and urge rear wall 24 against the rear, vertical surfaces 43 of notches 40 after rear wall 24 is seated in notches 40.

Figure 3:
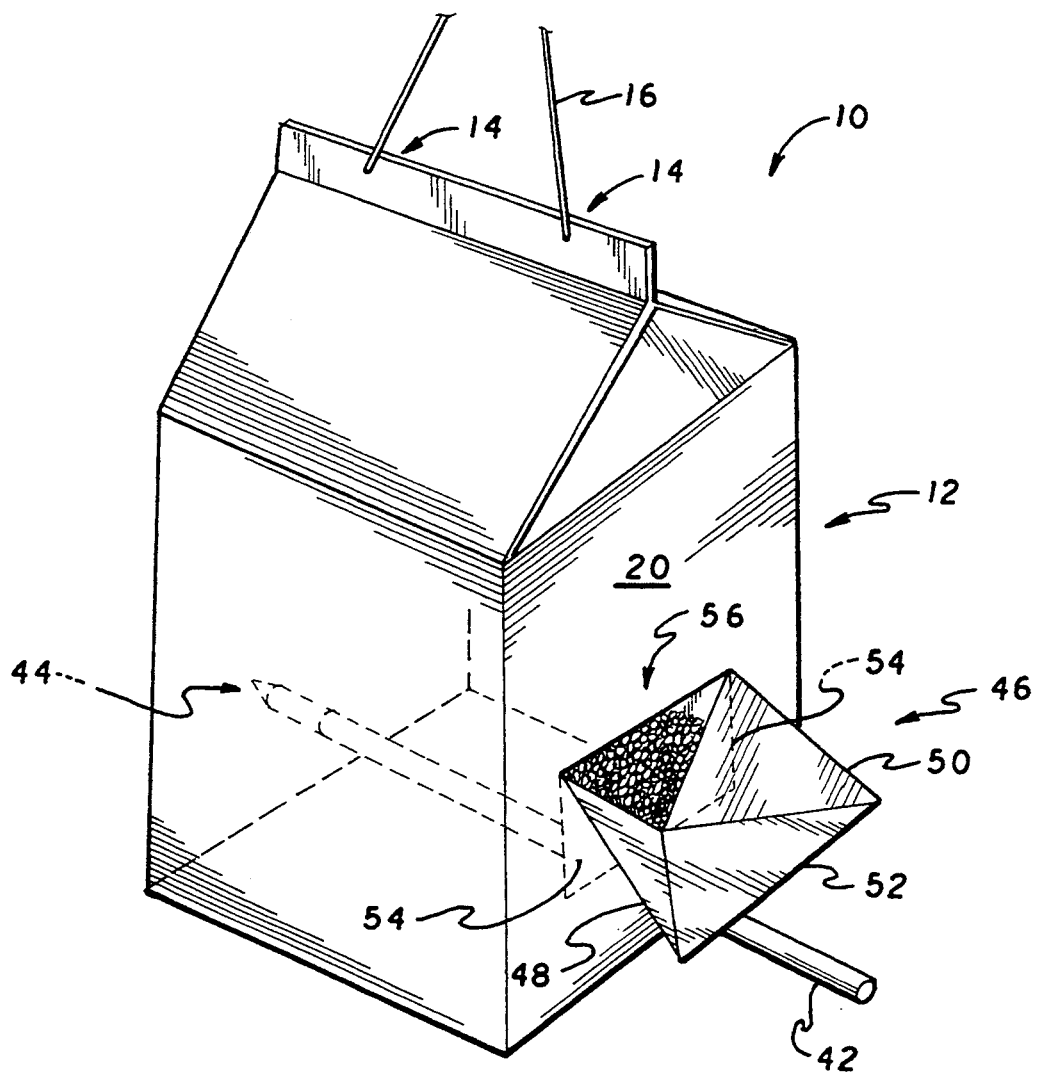
FIG. 3 is a perspective view of an alternative embodiment of the invention.

Turning now to FIG. 3, in a second embodiment, both feed trough and perch are provided by inexpensive, commonly available materials which need little modification to assume their preferred configurations. A rod or peg 42 is inserted through front and rear walls 20,24. If peg 42 is sharpened to include a point 44, then holes to accommodate peg 42 need not be formed prior to insertion of peg 42. In this embodiment, torsion of the perch is not a problem worthy of correction, since peg 42 is separate from the feeding trough.

A separate feed trough is provided by cutting and folding a section of waxed paperboard taken from a similar paperboard container, and forming a chute 46. Chute 46 is preferably formed to have left and right walls 48,50, front wall 52, and two tabs 54. Chute 46 is inserted into a front slot 56, and tabs 54 are caused to expand once inside paperboard container 12. Chute is thus locked in place, and bird feeder 10 is ready for deployment.

An uncomplicated bird feeder is hereby assembled with minimal effort and expense. Bird feeder 10 is readily suspended from a tree limb (not shown), and is easily filled with food by the customary unfolding and refolding of the peaked top. It may be made from any available size of container, a large container being illustrated in FIG. 1, and a smaller container being shown in FIG. 3. In fact, any size of commonly available milk or juice container could be employed, including, but not limited to, one-half pint, pint, quart, or half-gallon. Bird feeder 10 resists weather, and is easily and inexpensively replaced after its useful life expires.

It is to be understood that the present invention is not limited to the embodiments described above, but encompasses any and all embodiments within the scope of the following claims.

I claim:

1. A bird feeder comprising:
    a paperboard container including a first vertical wall having a first opening, an opposed vertical wall having a second opening, a peaked top and a floor; and
    a unitary member including a scoop defining a feed trough, a peg projecting horizontally from said scoop to define a perch, means for engaging a wall of said paperboard container, and an elongated stem connecting said scoop and said means for engaging a wall; wherein,
    said unitary member is supported on said floor, penetrates said first and second openings, and projects to the exterior of said paperboard container.

2. The bird feeder according to claim 1, further including suspension means enabling said bird feeder to be suspended from above, said suspension means comprising a flexible tether.

3. The bird feeder according to claim 1, said means for engaging a wall having means for defining an upwardly oriented groove including an inclined ramp and a vertical surface, whereby one said vertical wall of said paperboard container engages said unitary member, and is biased to maintain engagement therewith.

* * * * *